United States Patent
Kluckner et al.

(10) Patent No.: US 11,042,788 B2
(45) Date of Patent: Jun. 22, 2021

(54) METHODS AND APPARATUS ADAPTED TO IDENTIFY A SPECIMEN CONTAINER FROM MULTIPLE LATERAL VIEWS

(71) Applicant: Siemens Healthcare Diagnostics Inc., Tarrytown, NY (US)

(72) Inventors: Stefan Kluckner, Berlin (DE); Yao-Jen Chang, Princeton, NJ (US); Terrence Chen, Princeton, NJ (US); Benjamin S. Pollack, Jersey City, NJ (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 244 days.

(21) Appl. No.: 16/072,406

(22) PCT Filed: Jan. 24, 2017

(86) PCT No.: PCT/US2017/014773
§ 371 (c)(1),
(2) Date: Jul. 24, 2018

(87) PCT Pub. No.: WO2017/132167
PCT Pub. Date: Aug. 3, 2017

(65) Prior Publication Data
US 2018/0365530 A1    Dec. 20, 2018

Related U.S. Application Data

(60) Provisional application No. 62/288,366, filed on Jan. 28, 2016.

(51) Int. Cl.
*G06K 9/62* (2006.01)
*G01N 35/00* (2006.01)
(Continued)

(52) U.S. Cl.
CPC ..... *G06K 9/6269* (2013.01); *G01N 35/00732* (2013.01); *G01N 35/04* (2013.01);
(Continued)

(58) Field of Classification Search
None
See application file for complete search history.

(56) References Cited

U.S. PATENT DOCUMENTS

| | | | |
|---|---|---|---|
| 7,771,659 | B2 | 8/2010 | Ziegler |
| 8,194,235 | B2 | 6/2012 | Kosaka et al. |

(Continued)

FOREIGN PATENT DOCUMENTS

| | | |
|---|---|---|
| CN | 1673742 A | 9/2005 |
| CN | 102478568 A | 5/2012 |

(Continued)

OTHER PUBLICATIONS

PCT International Search Report and Written Opinion dated Apr. 7, 2017 (10 Pages).
(Continued)

*Primary Examiner* — Bernard Krasnic (57) ABSTRACT

A model-based method of determining characteristics of a specimen container. The method includes providing a specimen container, capturing images of the specimen container at different exposures times and at different spectra having different nominal wavelengths, selecting optimally-exposed pixels from the images at different exposure times at each spectra to generate optimally-exposed image data for each spectra, and classifying the optimally-exposed pixels as at least being one of tube, label or cap, and identifying a width, height, or width and height of the specimen container based upon the optimally-exposed image data for each spectra.

(Continued)

Quality check modules and specimen testing apparatus adapted to carry out the method are described, as are other aspects.

20 Claims, 7 Drawing Sheets

(51) Int. Cl.

| | |
|---|---|
| *G06T 5/00* | (2006.01) |
| *G06T 5/50* | (2006.01) |
| *G06T 7/11* | (2017.01) |
| *G01N 35/10* | (2006.01) |
| *G06T 7/60* | (2017.01) |
| *G01N 35/04* | (2006.01) |
| *H04N 5/247* | (2006.01) |
| *G01N 35/02* | (2006.01) |

(52) U.S. Cl.
CPC ......... *G01N 35/1016* (2013.01); *G06T 5/009* (2013.01); *G06T 5/50* (2013.01); *G06T 7/11* (2017.01); *G06T 7/60* (2013.01); *H04N 5/247* (2013.01); *G01N 35/02* (2013.01); *G01N 2035/00752* (2013.01); *G01N 2035/0406* (2013.01); *G01N 2035/047* (2013.01); *G01N 2035/0493* (2013.01); *G01N 2035/1018* (2013.01); *G01N 2035/1025* (2013.01); *G06T 2207/10024* (2013.01); *G06T 2207/10144* (2013.01); *G06T 2207/10152* (2013.01); *G06T 2207/20081* (2013.01); *G06T 2207/20084* (2013.01)

(56) References Cited

U.S. PATENT DOCUMENTS

| | | | |
|---|---|---|---|
| 8,321,055 | B2 | 11/2012 | Chen et al. |
| 10,746,665 | B2 | 8/2020 | Kluckner et al. |
| 10,746,753 | B2 * | 8/2020 | Kluckner ........... G01N 35/1016 |
| 10,816,538 | B2 | 10/2020 | Kluckner et al. |
| 10,928,310 | B2 | 2/2021 | Wissmann et al. |
| 2002/0146167 | A1 | 10/2002 | Imamura et al. |
| 2005/0214166 | A1 | 9/2005 | Itoh |
| 2006/0000968 | A1 | 1/2006 | Katayama et al. |
| 2007/0053794 | A1 | 3/2007 | Perez et al. |
| 2009/0220148 | A1 | 9/2009 | Levy et al. |
| 2009/0324032 | A1 * | 12/2009 | Chen .................... G06K 9/3233 382/128 |
| 2010/0013983 | A1 | 1/2010 | Ward et al. |
| 2011/0045521 | A1 | 2/2011 | Itoh |
| 2011/0050884 | A1 | 3/2011 | Niedermeier et al. |
| 2011/0102542 | A1 | 5/2011 | Chen et al. |
| 2012/0080515 | A1 | 4/2012 | van der Merwe |
| 2012/0138674 | A1 | 6/2012 | Chen |
| 2012/0140230 | A1 | 6/2012 | Miller |
| 2013/0076882 | A1 | 3/2013 | Itoh |
| 2013/0123089 | A1 | 5/2013 | Johns et al. |
| 2015/0002704 | A1 | 1/2015 | Vidal-Naquet |
| 2015/0241457 | A1 * | 8/2015 | Miller ............... G01N 35/00732 348/143 |
| 2018/0372648 | A1 | 12/2018 | Wissmann et al. |
| 2019/0033209 | A1 * | 1/2019 | Kluckner ............... G01N 21/31 |
| 2019/0271714 | A1 * | 9/2019 | Kluckner ............... G01N 21/25 |

FOREIGN PATENT DOCUMENTS

| | | |
|---|---|---|
| JP | 2009198266 A | 9/2009 |
| JP | 2010096515 A | 4/2010 |
| JP | 2010-107400 A | 5/2010 |
| JP | 2011-252804 A | 12/2011 |
| JP | 2012-217102 A | 11/2012 |
| JP | 2012-234245 A | 11/2012 |
| JP | 2013-501937 A | 1/2013 |
| JP | 2013-072806 A | 4/2013 |
| JP | 2015-172509 A | 10/2015 |
| WO | 2006/055413 A2 | 5/2006 |
| WO | 2007/030324 A3 | 3/2007 |
| WO | 2014/031576 A1 | 2/2014 |

OTHER PUBLICATIONS

Extended EP Search Report dated Dec. 17, 2018 of corresponding European Application No. 17744778.6, 4 Pages.

* cited by examiner

METHODS AND APPARATUS ADAPTED TO IDENTIFY A SPECIMEN CONTAINER FROM MULTIPLE LATERAL VIEWS

RELATED APPLICATION

This application is a national phase application of PCT/US17/14773 filed on Jan. 24, 2017 under 35 U.S.C. 371, which claims priority to U.S. Provisional Patent Application Ser. No. 62/288,366 entitled "METHODS AND APPARATUS ADAPTED TO IDENTIFY A SPECIMEN CONTAINER FROM MULTIPLE LATERAL VIEWS" filed on Jan. 28, 2016, the disclosures of each of which is hereby incorporated by reference in their entirety herein.

FIELD

The present invention relates to pre-analytical methods and apparatus for use in biological specimen testing, and, more particularly, to methods and apparatus for determining a configuration of a specimen container containing a specimen.

BACKGROUND

Automated testing systems may conduct assays or clinical analysis using one or more reagents to identify an analyte or other constituent in a specimen such as urine, blood serum, blood plasma, interstitial liquid, cerebrospinal liquids, and the like. For convenience and safety reasons, these specimens are almost universally contained within sample containers (e.g., blood collection tubes), which may be capped with a cap. The assay/test reactions generate various changes that may be read and/or manipulated to determine a concentration of analyte or other constituent contained in the specimen, that may, in some embodiments, be indicative of a patient's disease state.

Improvements in automated testing technology have been accompanied by corresponding advances in pre-analytical sample preparation and handling operations such as sorting, batch preparation, centrifugation of sample containers to separate sample constituents, cap removal to facilitate fluid access, sample container delivery, and the like by automated systems called Laboratory Automation Systems (LASs). LASs may automatically transport a specimen in a specimen container to one or more pre-analytical sample processing stations so that various operations can be performed thereon prior to performing the analysis.

These LASs may handle a number of different specimens contained in standard, barcode-labeled sample tubes. The barcode label may contain an accession number that may be correlated to demographic information that may be entered into a hospital's Laboratory Information System (LIS) along with test orders and other desired information. An operator may place the labeled specimen containers onto the LAS system, which may automatically sort and route the specimen containers for pre-analytical operations such as centrifugation, de-capping, and aliquot preparation, and all prior to the specimen actually being subjected to clinical analysis by one or more analyzers that may also be part of the LAS.

For certain tests, a serum or plasma portion (obtained from whole blood by centrifugation) may be used to carry out the analysis. A gel separator may be added to the specimen container to aid in the separation of a settled blood portion from the serum or plasma portion in some cases. After centrifuging, the specimen container may be transported to an appropriate analyzer that may extract serum or plasma portion of the specimen from the specimen container and combine the specimen with one or more reagents in a reaction vessel (e.g., cuvette). Analytical measurements may then be performed, often using a beam of interrogating radiation, for example, or by using photometric or fluorometric absorption readings, or the like. The measurements allow determination of end-point or rate values, from which an amount of analyte or other constituent can be determined using well-known techniques.

Unfortunately, the determination of the demarcation between the various portions (e.g., settled portion, serum and plasma portion, and gel separator) in the specimen may be difficult to determine using existing methods, as is the size or type of the specimen container. Thus, the volume of the resultant serum or plasma portion or the relative amounts of settled portion and serum or plasma portion may be difficult to accurately determine.

In testing systems, the specimen containers presented for analysis may be of varying sizes, such as of differing height and differing diameters and may also contain different materials, such as gel separator, clotting agent such as powdered glass clot activator or thrombin-based activator, anti-clotting agent such as ethylenediaminetetraacetic acid (EDTA), sodium or lithium-heparin, or acid citrate dextrose (ACD), antiglycolytic additives such as sodium fluoride and potassium oxalate. Cap color may be used to identify the different additives and may be indicative of the test type to be run on the specimen or simply tube type. For example, a red colored cap is sometimes used to refer to a serum collection tube, which may generally include a clotting agent such as a clot activator and may also include a gel separator. Orange caps may include a thrombin-based clot activator and may be used for stat testing where clotting is needed quickly. Anticoagulation cap colors such as purple may include EDTA and may identify basis hematology tube used for tests of blood type and counting cells. Light blue cap color may identify addition of sodium citrate for coagulation and platelet function tests. Green caps may identify tubes including lithium/sodium heparin for plasma tests. Yellow may include sodium polyanethol sulfonate and be used for bacterial growth and microbiology tests.

It is desirable to evaluate the sizes and types of the specimen container without the use of visual inspection by a laboratory technician, but via an automated method because of the propensity for human error. Further, specimen containers may include barcode labels adhered directly to the specimen container. The one or more labels may partially occlude the specimen, so that there may not be clear opportunity to visually observe the serum or plasma portion of the specimen. Other systems, such as those described in US Pat. Pub. 2012/0140230 to Miller describe rotating the sample container to find a view window that is unobstructed by the label and then measuring the relative size of the specimen container and cap type using an optical imaging system. However, such systems may be less prone to ease of automation.

Because of the difficulties encountered in determining the size or type of specimen container, there is an unmet need for a method and apparatus adapted to readily determine size and type as part of a pre-screening process. The method and apparatus carrying out the pre-screening should not appreciably adversely affect the speed that analytical test results are obtained, i.e., appreciably slow the overall testing process. Furthermore, the method and apparatus should be able to be used even on labeled sample containers and without rotation thereof.

SUMMARY

According to a first aspect, a method of determining characteristics of a specimen container is provided. The method includes providing a specimen container, capturing images of the specimen container at different exposures times and at different spectra having different nominal wavelengths, selecting optimally-exposed pixels from the images at different exposure times at each spectra to generate optimally-exposed image data for each spectra; classifying the optimally-exposed pixels as at least being one of tube, label or cap, and identifying a width, height, or width and height of the specimen container based upon the optimally-exposed image data for each spectra.

According to another aspect, a quality check module adapted to determine characteristics of a specimen container is provided. The quality check module includes a plurality of cameras arranged at multiple viewpoints around an imaging location adapted to receive the specimen container, each of the plurality of cameras configured to capture multiple images of at least a portion of the specimen container at different exposures times and at different spectra having different nominal wavelengths from the multiple viewpoints, and a computer coupled to the plurality of cameras, the computer configured and operable to: select optimally-exposed pixels from the images at the different exposure times at each of the different spectra to generate optimally-exposed image data for each spectra and viewpoint, classify the optimally-exposed image data as at least being one of tube, cap, or label, and identify a width, height, or width and height of the specimen container based upon the optimally-exposed image data for each spectra.

In another aspect, a testing apparatus is provided. The testing apparatus includes a track, specimen carriers moveable on the track, the specimen carriers configured to carry specimen containers; and a quality check module arranged on the track and adapted to determine characteristics of a specimen container, the quality check module comprising: a plurality of cameras arranged at multiple viewpoints around an imaging location adapted to receive the specimen container, each of the plurality of cameras configured to capture multiple images of at least a portion of the specimen container at different exposures times and at different spectra having different nominal wavelengths from the multiple viewpoints, and a computer coupled to the plurality of cameras, the computer configured and operable to: select optimally-exposed pixels from the images at the different exposure times at each of the different spectra to generate optimally-exposed image data for each spectra and viewpoint, classify the optimally-exposed image data as at least being one of tube, cap, or label, and identify a width, height, or width and height of the specimen container based upon the optimally-exposed image data for each spectra.

Still other aspects, features, and advantages of the present invention may be readily apparent from the following description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The invention is to cover all modifications, equivalents, and alternatives falling within the scope of the appended claims.

BRIEF DESCRIPTION OF THE DRAWINGS

The drawings, described below, are for illustrative purposes only and are not necessarily drawn to scale. The drawings are not intended to limit the scope of the invention in any way. Like numerals are used throughout the drawings to denote like elements.

DESCRIPTION

In a first broad aspect, embodiments of the present invention provide imaging methods and apparatus configured to, and capable of, being operated (operable) to determine physical attributes of a specimen container, such as width (W), and height of the specimen container (HT). In one or more embodiments, the method may determine the presence of a cap, may identify the cap type, and/or may identify the cap color. In one or more embodiments, a holder of the specimen container may be identified so that its impact on the characterization can be eliminated or at least minimized.

Knowing the width (W) of the specimen container can be used for further quantification (e.g., volume or depth) of the various portions of the specimen, such quantification of the serum or plasma portion, settled blood portion, or both. The cap type and/or cap color may be correlated with test requests from the LIS to verify that the proper specimen container has been used for the test that has been ordered, and/or to ensure that the test ordered will not be adversely impacted by any additives present in the specimen container. Height of the specimen container HT may be used by the robotic system to establish a home height for the pipette of an aspiration system to minimize specimen container-pipette collisions. Further, the HT may be used so that the any robot grippers may appropriately grasp the specimen container.

The specimen, as described herein, may be collected in a specimen container, such as a blood collection tube and may include a serum and plasma portion and a settled blood portion following fractionation (e.g., separation by centrifugation). The settled blood portion is made up blood cells such as white blood cells (leukocytes), red blood cells (erythrocytes), and platelets (thrombocytes), which are aggregated and separated from the serum or plasma portion, usually through undergoing centrifugation. The settled blood portion is generally found at a bottom part of the specimen container. The serum or plasma portion is the liquid component of blood, which is not part of the settled blood portion. It is generally found above the settled blood portion.

Plasma and serum differ in the content of coagulating components, primarily fibrinogen. Plasma is the un-clotted liquid, whereas serum refers to blood plasma, which has been allowed to clot, under the influence of a clotting agent such as endogenous enzymes or exogenous components. The serum or plasma portion will be made of serum or plasma depending upon whether exposed to a clotting agent. In some cases, the blood specimen may be exposed to an anti-clotting agent. In some specimen containers, a small gel separator may be used, which generally positions itself between the settled blood portion and the serum or plasma portion during centrifugation. It serves as a separation barrier between the two portions.

In accordance with one or more embodiments, the method may be carried out as a pre-analytical testing method, i.e., as pre-screening method before carrying out analysis on a clinical analyzer or assaying instrument. In one or more embodiments, the method may be carried out prior to, or simultaneous with, the specimen being quantified, characterized for the presence of an artifact (e.g., clot, bubble, or foam) and/or the presence of an interferent (e.g., hemolysis, Icterus, or Lipemia (HIL)). Thus, in one or more embodiments, the present invention provides useful characterization of the dimensions of the specimen container for further pre-analytical testing or for analytical testing after being pre-inspected for physical dimensions at a quality check module.

In one or more embodiments, the method uses high dynamic range (HDR) image processing to aid in determining the physical structure of the specimen container. Of course, in some embodiments, the identification of the location of various physical boundaries of the serum or plasma portion, and/or other blood components may also take place using HDR image processing.

In some embodiments, a quality check module configured to carry out the dimensional characterization method is provided. The quality check module may be provided in an area where a robotic or transport mechanism may transport specimens contained in such specimen containers to the quality check module. In some embodiments, the quality check module may be provided on a conveyor track, where the conveyor track carries the specimens to remote locations for analysis (e.g., analytical testing or assaying). Chemical analysis or assaying may take place on a suitable analyzer. The term "analyzer" as used herein means clinical chemistry analyzers, and/or assaying instruments, and/or the like. In one embodiment, the quality check module may be provided on the track so that the specimen container may be characterized for dimensions while resident on the track, such as on an input lane or elsewhere on the track.

In one or more embodiments, the processed HDR data may be used for dimensional characterization, but also for volume quantification, artifact detection, and/or HIL detection. All the captured images used by the dimension quantification method herein are pixelated images containing a plurality of pixels. Pixel as used herein means single pixels or a grouping of pixels, such as a super pixel. A super pixel having a size of 11 individual pixels by 11 individual pixels was found to work well for scanning and processing. Other suitable sizes of super pixels may be used.

In another aspect of one or more embodiments of the invention, the data on the width (W) of the specimen container obtained from the dimensional characterization can be used, along with boundary information obtained from segmentation to determine the depth or volume of the serum or plasma portion, and also possibly even a depth or volume of the settled blood portion.

The characterization method including HDR processing may include capturing multiple images at the quality check module at multiple exposures (e.g., exposure times), while illuminated at multiple spectra having different nominal wavelengths, and even from multiple viewpoints. In some embodiment, images may be captured with multiple cameras arranged within the quality check module. "Camera" as used herein means any device capable of capturing an image (e.g., digital image) for analysis.

The images captured by the multiple cameras are then processed by a computer to determine dimensions of the specimen container, and may also be used to quantify depths and/or volumes of the specimen. During a segmentation process, for each pixel in each of the images, pixels exhibiting optimal image intensity (i.e., optimal exposure) for each spectra may be selected and combined together with other optimal pixels from other pixel locations to generate consolidated spectra image data sets. The result is a plurality of normalized, consolidated spectra image data sets (e.g., red (R), green (G), blue (B)) where all of the pixels are optimally exposed (e.g., one image data set per each spectra (e.g., R, G, and B).

The data from the normalized, consolidated color data sets may be subject to statistical analysis to determine statistical data on each pixel (e.g., mean and covariance matrix) thereof. "Covariance" is a measure of how much two or more of the pixel attributes such as intensity, correlate. This statistical data, in the form of one or more data matrices, can then be operated on by a multi-class classifier. From this, the segmentation of the various regions/areas of the specimen container may be classified. In particular, the width (W) of the specimen container may be identified. Further, the height (HT) of the specimen container, the type of cap, and the color of the cap may also be determined.

The multi-class classifier may be used to perform the segmentation task. The classifier may be a support vector machine (SVM) or a random decision tree, for example, that has been trained from multiple training sets. However, other types of classifiers may be used.

The dimensions of the specimen container may be determined based upon the output from the segmentation process. The liquid region (i.e., the serum or plasma portion) may be defined by the classifier as well, and the boundary data together with the width (W) obtained by the dimensional characterization method may be used to determine a volume of the liquid region (e.g., serum or plasma portion).

Further details of inventive dimensional characterization methods, quality check modules, and specimen testing systems including the quality check module will be described with reference to FIGS. 1-7 herein.

Figure 1:
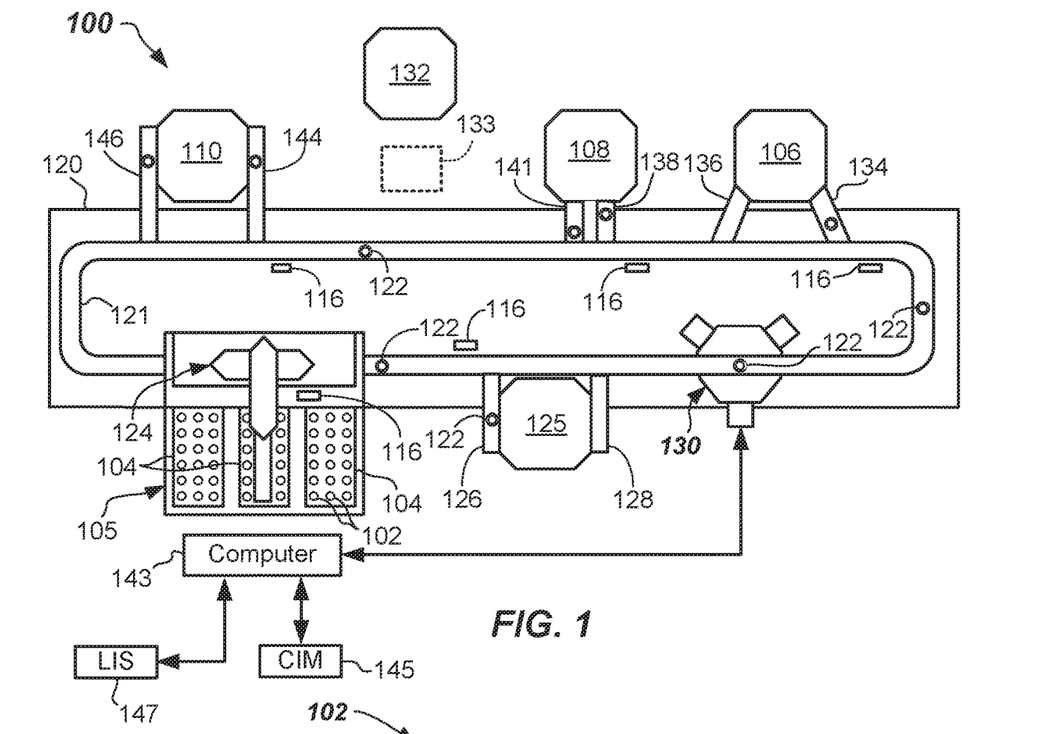
FIG. 1 illustrates a top view of a specimen testing apparatus including one or more quality check modules and one or more analyzers (clinical chemistry or assay instruments) according to one or more embodiments.

FIG. 1 shows a specimen testing apparatus 100 capable of and operable to automatically process multiple ones of the specimen containers 102 that may be contained in one or more racks 104 provided at a loading area 105 prior to analysis by one or more analyzers (e.g., first, second, and third analyzer 106, 108, 110, respectively, arranged about the specimen testing apparatus 100). It should be apparent that more or less numbers of analyzers can be used. The analyzers may be one or more clinical chemistry analyzers and/or one or more assaying instruments, or the like, or combinations thereof. The specimen containers 102 may be any generally transparent or translucent container, such as blood collection tubes—see FIG. 2).

Figure 2:
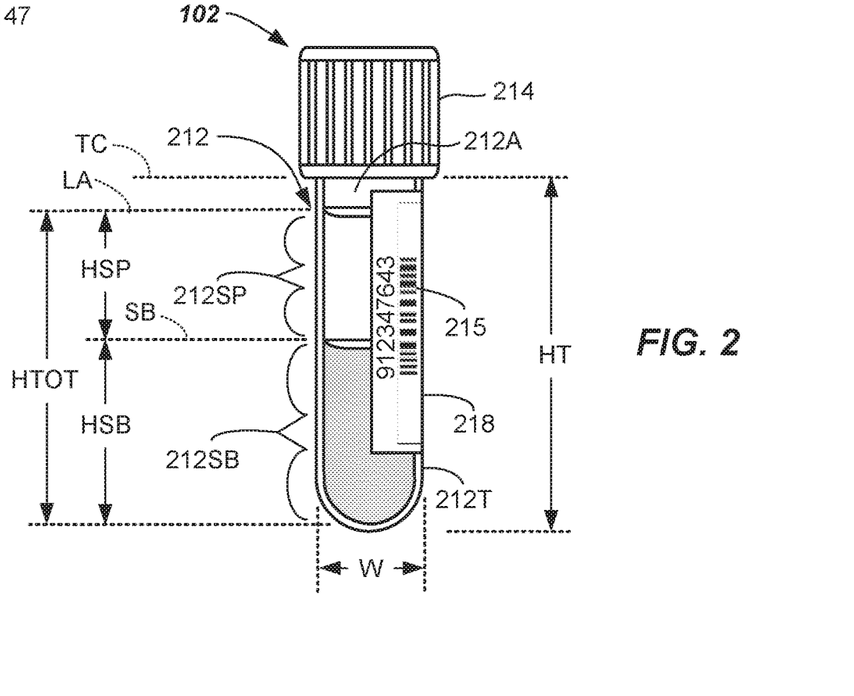
FIG. 2 illustrates a side view of a labeled specimen container including a separated specimen that may be quantified by a dimension quantification method according to one or more embodiments.

Typically, specimens 212 (FIG. 2) to be automatically processed may be provided to the specimen testing apparatus 100 in the specimen containers 102, which may be capped with a cap 214 (FIG. 2—otherwise referred to as a stopper). The caps 214 may have different shapes or colors (e.g., red, royal blue, light blue, green, grey, tan, yellow, or other colors). The colors provide useful information about the testing to be performed, or the additives provided in the specimen container 102 in some instances. Each of the specimen containers 102 may include a tube 212T that may be provided with identification information 215, such as a barcode, alphabetic, numeric, or alphanumeric indicia, or combination thereof that may be machine readable at various locations about the specimen testing apparatus 100. The identification information 215 may indicate a patient's identification and possibly tests be accomplished upon the specimen 212, for example. The identification information 215 may also be coordinated with a laboratory information system (LIS) 147 to provide additional information on the testing ordered or the like. Such identification information 215 may be generally provided on a label 218 adhered to, or otherwise provided on the side of, the specimen container 102. The label 218 generally does not extend all the way around the girth of the specimen container 102, or all along a length of the specimen container 102. Accordingly, although the label 218 may occlude some portion of the specimen 212, but some portion of the specimen 212 may still be viewable. In some embodiments multiple slightly overlapping labels 218 may be present. In some embodiments, the racks 104 may have additional identification information thereon that may be used for tracking.

After fractionation, the specimen 212 may include a serum or plasma portion 212SP, a settled blood portion 212SB contained within the tube 212T. Air 212A may be provided above the serum and plasma portion 212SP and the line or demarcation between air 212A and the serum or plasma portion 212SP is defined herein as the liquid-air interface (LA). The line of demarcation between the serum or plasma portion 212SP and the settled blood portion 212SB is defined herein as the serum-blood interface (SB). The interface between the air 212A and the cap 214 is referred to herein as the tube-cap interface (TC). The height of the tube (HT) is defined as the height from the physical bottom-most part of the tube 212T to the bottom of the cap 214. The height of the serum or plasma portion 212SP is (HSP) is defined as the height from the top of the settled blood portion 212SB to the top of the serum or plasma portion 212SP, i.e., from SB to LA. The height of the settled blood portion 212SB is (HSB) is defined as the height from the bottom of the settled blood portion 212SB to the top of the settled blood portion 212SB. In embodiments where a gel separator 313 is used, such as FIG. 3, an interface (SG) between the serum or plasma portion 212SP and the gel separator 313 is present. Likewise, an interface (BG) between the settled blood portion 212SB and the gel separator 313 is present. HTOT is HSB plus HSP in this case. W is the width of the tube 212T.

In more detail, specimen testing apparatus 100 may include a base 120 (e.g., a frame or other structure) upon which a track 121 may be mounted or supported. Track 121 may be a railed track (e.g., monorail track or multiple rail track), a collection of conveyor belts, chains, moveable platforms, or other suitable conveyance mechanisms. Track 121 may have a circular, serpentine or other shape, and may be a closed (i.e., never ending) track in some embodiments. Track 121 may transport individual ones of the specimen containers 102 that may be carried on the track 121 in carriers 122, or multiple ones of the specimen containers 102 in some embodiments. Specimen container 102 may be adapted to be received in a receptacle of the carrier 122 moveable on the track 121.

In one or more embodiments, carriers 122 may be pucks that are configured to carry a single specimen container 102. In some embodiments, the carrier 122 may include an onboard drive motor, such as a linear motor, that is configured to move the specimen container 102 about the track 121 while stopping and starting according to programmed instructions. Carriers 122 may each include a holder 122H adapted to hold and secure the specimen container 102 in a defined upright position. Holder 122H may include three or more thin leaf springs or fingers.

In some embodiments, carriers 122 may leave from the loading area 105 having one or more racks 104 thereat. Loading area 105 may serve a dual function of also allowing offloading of the specimen containers 102 from the carriers 122 after processing. A robot 124 may be provided at the loading area 105 and may be configured to grasp the specimen containers 102 from the one or more racks 104 and move and load the specimen containers 102 onto the carriers 122, such as onto an input lane of the track 121. Input lane may be part of the main portion of the track 121 or an offshoot therefrom. Robot 124 may also be configured to remove specimen containers 102 from the carriers 122 upon completion of testing. The robot 124 may include one or more (e.g., least two) robot arms or components capable of X and Z, Y and Z, X, Y, and Z, or r and theta motion, wherein the robot 124 may be equipped with robotic clamping fingers adapted to pick up and place the specimen containers 102. However, any suitable type of robot 124 may be used.

Upon being loaded onto track 121 by robot 124, the specimen containers 102 carried by carriers 122 may progress to a centrifuge 125 (e.g., an automated centrifuge configured to carry out fractionation of the specimen 212) and may be diverted to the centrifuge 125 by inflow lane 126 in some embodiments. After being centrifuged, the specimen containers 102 may exit on outflow lane 128 and continue on the track 121. In some embodiments, the carriers 122 may move on to a quality check module 130 to be further described herein with reference to FIGS. 4A-4D. Optionally, the centrifugation may occur previously and the specimens 212 contained in specimen containers 102 may be loaded directly into a quality check module 130 that is located at the loading area 105, such as part of the input lane.

The quality check module 130 is configured and adapted to automatically determine/characterize physical attributes of the specimen container 102 containing the specimen 212 to be processed by the specimen testing apparatus 100. Characterization may include characterizing tube size, cap type, and/or cap color. Once characterized, the specimen 212 may be further characterized to determine the depth and/or volume of the specimen 212, screened for HIL, and/or a presence of one or more artifacts. If found to contain no HIL and/or no artifact(s), the specimens 212 may continue on the track 121 and then may be analyzed in the one or more analyzers (e.g., first, second and third analyzers 106, 108, and/or 110) before returning each specimen container 102 to the loading area 105 for offloading.

In some embodiments, quantification of physical attributes of the specimen container 102 may take place at the quality check module 130 (i.e., determining HT, cap color, cap type, TC, tube type, and/or W). In some embodiments, quantification of the specimen 212 may also take place at the quality check module 130 and may involve determination of HSB, HSP, HTOT, and may determine a vertical location of SB, LA, SG, and/or BG. As will be apparent, the holder 122 may also be identified, but may be ignored when later processing the various images.

Additionally, a remote station 132 may be serviced by the automated specimen testing apparatus 100 even though the remote station 132 is not directly linked to the track 121 of the specimen testing apparatus 100. For instance, an independent robot 133 (shown dotted) may carry specimen containers 102 to the remote station 132 and return them after testing/processing. Optionally, the specimen containers 102 may be manually removed and returned. Remote station 132 may be used to test for certain constituents, such as a hemolysis level, or may be used for further processing, such as to lower a lipemia level through additional processing, or remove an artifact found in the specimen 212, such as a clot, bubble or foam, for example. Other testing or processing may be accomplished at remote station 132.

The specimen testing apparatus 100 may include a number of sensors 116 at one or more locations around the track 121. Sensors 116 may be used to detect a location of specimen containers 102 along the track 121 by means of reading the identification information 215 (FIG. 2) placed on the specimen container 102, or like information (not shown) that is provided on each carrier 122, such as a barcode. Other means for tracking the location of the carriers 122 may be used. All of the sensors 116 interface with the computer 143 so that the location of each specimen container 102 and specimen 212 is known at all times. Computer 143 may interface and communicate with LIS 147 in a known manner.

Centrifuge 125 and each of the analyzers 106, 108, 110 may be generally equipped with robotic mechanisms and/or inflow lanes (e.g., inflow lanes 126, 134, 138, 144) configured to remove carriers 122 from the track 121, and robotic mechanisms and/or outflow lanes (e.g., outflow lanes 128, 136, 141 and 146) configured to reenter carriers 122 to the track 121.

Specimen testing apparatus 100 may be controlled by the computer 143, which may include a microprocessor-based central processing unit CPU, having a suitable memory, software, and suitable conditioning electronics and drivers for operating the various system components. Computer 143 may be housed as part of, or separate from, the base 120 of the specimen testing apparatus 100. The computer 143 may operate to control movement of the carriers 122 to and from the loading area 105, motion about the track 121, motion to and from the centrifuge 125, operation of the centrifuge 125, motion to and from the quality check module 130 as well as operation of the quality check module 130, and motion to and from each analyzer 106, 108, 110, and in some cases, possibly operation of each analyzer 106, 108, 110 carrying out the various types of testing (e.g., assay and/or clinical chemistry).

For all but the quality check module 130, the computer 143 may control the specimen testing apparatus 100 according to software, firmware, and/or hardware commands or circuits such as those used on the Dimension® clinical chemistry analyzer sold by Siemens Healthcare Diagnostics Inc. of Tarrytown, N.Y., and such control is typical to those skilled in the art of computer-based electromechanical control programming and will not be further described herein. However, other suitable systems for controlling the specimen testing apparatus 100 may be used. The control of the quality check module 130 to characterize the specimen container may also be provided by the computer 143, but according to an inventive model-based method, as will be described in detail herein. Optionally, it could be provided by a separate computer coupled to the computer 143.

Embodiments of the present invention may be implemented using a computer interface module (CIM) 145 that allows for a user to easily and quickly access a variety of control and status display screens. These control and status screens may describe some or all aspects of a plurality of interrelated automated devices used for preparation and analysis of specimens 212. The CIM 145 may be employed to provide information about the operational status of a plurality of interrelated automated devices as well as information describing the location of any specimen 212 as well as a status of screening or tests to be performed on, or being performed on, the specimen 212. The CIM 145 may be adapted to facilitate interactions between an operator and the specimen testing apparatus 100. The CIM 145 may include a display screen adapted to display a menu including icons, scroll bars, boxes, and buttons through which the operator may interface with the specimen testing apparatus 100. The menu may comprise a number of function buttons programmed to display functional aspects of the specimen testing apparatus 100.

Figures 4A, 4B:
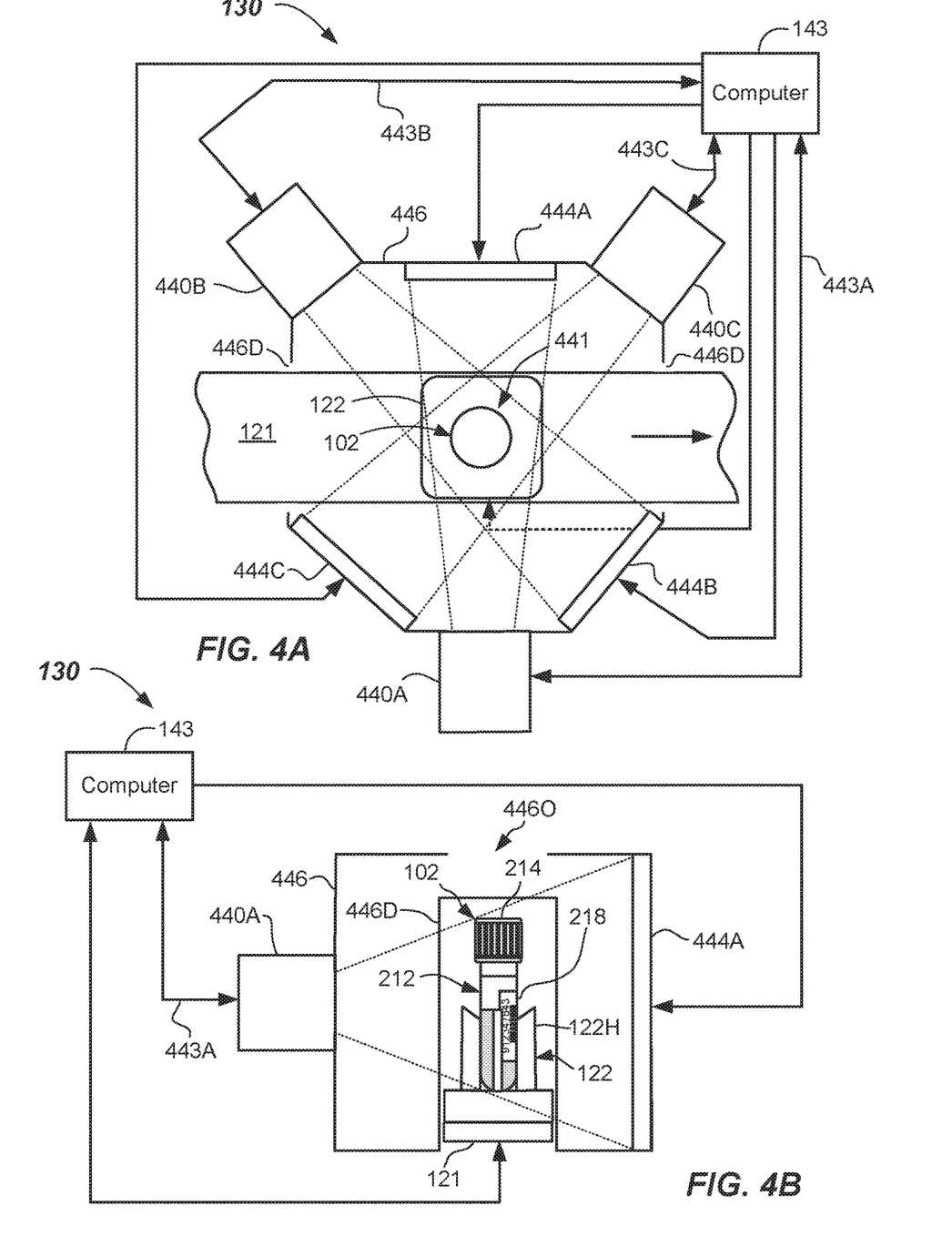
FIG. 4A illustrates a schematic top view of a quality check module (with top housing portion removed to aid illustration) configured to capture and analyze multiple images according to one or more embodiments.
FIG. 4B illustrates a schematic side view (with side housing portion removed to aid illustration) of the quality check module of FIG. 4A according to one or more embodiments.

With reference to FIGS. 4A-4B, a first embodiment of a quality check module 130 is shown and described. Quality check module 130 may be configured and adapted to automatically characterize a physical structure (e.g., size) of the specimen container 102. The dimension characterization method may be carried out by the quality check module 130 prior to being automatically processed by one or more of the analyzers 106, 108, 110. In this manner, the size of the specimen container is known for any subsequent processing. The quality check module 130 may be used to quantify the specimen container 102, i.e., quantify certain physical dimensional characteristics of the specimen container 102, such as the location of TC, HT, and/or W and/or Wi of the specimen container 102, and/or a color of, and/or type of, the cap 214. The quality check module 130 may be used to quantify the holder 122H such that the holder 122H may be ignored when later processing the images.

In addition to the specimen container quantification method, other detection methods may take place on the specimen 212 contained in the specimen container 102 at the quality check module 130. For example, the quality check module 130 may be used to quantify the specimen 212, i.e., determine certain physical dimensional characteristics of the specimen 212 (e.g., a physical location of LA, SB, SG, and/or BG, and/or determination of HSP, HSB, and/or HTOT, and/or a volume of the serum or plasma portion (VSP) and/or a volume of the settled blood portion (VSB).

Again referring to FIGS. 1, 4A and 4B, the quality check module 130 may include multiple cameras (e.g., two or more, three or more, four or more). Cameras may be conventional digital cameras (e.g., color or monochrome cameras), charged coupled devices (CCD), an array of photodetectors, two or more CMOS sensors, or the like. For example, three cameras 440A, 440B, 440C are illustrated in FIG. 4A and may be configured to capture images at an imaging location from three different viewpoints. Other numbers of cameras may be used. Each camera 440A, 440B, 440C may be a device capable of capturing a digital image (i.e., a pixelated image) at the imaging location. The image resolution of each image may be about 0.5 MP to 3 MP, for example. Other pixel resolutions may be used. Each camera 440A, 440B, 440C may be configured and operable to capture lateral images of at least a segment or lateral portion of the specimen container 102 at the imaging location, and at least a portion of the specimen 212, and possibly capture a part of the label 218 and cap 214. The images may overlap slightly. Eventually, from the multiple images, a composite image of the specimen 212 in the specimen container 102 can be developed. In some embodiments, the final composite image may be a 3D image of the specimen container 102 and contained specimen 212 at the imaging location based on images from the multiple cameras 440A, 440B, 440C.

In the embodiment shown, the plurality of cameras 440A, 440B, 440C may be arranged around the specimen 212 located at the imaging location and configured to capture lateral images from multiple viewpoints. The viewpoints may be radially spaced at approximately equally intervals from one another. As depicted, the intervals may be about 120 degrees from one another, when three cameras 440A, 440B, 440C are used. In the embodiment shown, the cameras 440A, 440B, 440C may be arranged around the sides of the track 121. Other arrangements of the plurality of cameras 440A, 440B, 440C may be used. In this way, the images of the specimen container 102 and specimen 212 may be taken at the imaging location while the specimen container 102 is residing and held in the carrier 122 on the track 121.

In one or more embodiments, the carrier 122 may be stopped at the pre-determined imaging location in the quality check module 130, such as at a point where normal vectors from each of the cameras 440A, 440B, 440C intersect. In some embodiments, a gate may be provided to stop the carrier 122, so that good quality images may be captured. Gate may release the carrier 122 after the sequence of images are captured. In other embodiments, the carrier 122 may include a linear motor configured and programmed to start and stop the carrier 122 at desired locations, such as at the quality check module 130. Other suitable means for stopping the carrier 122 may be used.

The cameras 440A, 440B, 440C may be provided in close proximity to and trained or focused to capture an image window, i.e., an area including an expected location of the surface of the specimen container 102, wherein the specimen container 102 may be approximately located in a center of the image window. As configured, the cameras 440A, 440B, 440C can capture images that include portions of the serum or plasma portion 212SP, portions of the settled blood portion 212SB, and some or all of the cap 214. Within the images captured, one or more reference datum may be present. The reference datum may aid in further quantification of the specimen 212 and/or specimen container 102. Reference datum may be TC or a bottom-most surface of the specimen container 102, or both. Optionally, the specimen containers 102 themselves may include a mark or other locating indicia provided thereon that can be viewed from any viewpoint.

In operation, each of the images captured by the quality check module 130 may be triggered and captured responsive to a triggering signal. The triggering signal may be generated by the computer 143 and provided in communication lines 443A, 443B, 443C coupled to the computer 143. Each of the captured images may be processed according to one or more embodiments of the method provided herein. In particular, HDR image processing may be used to capture and process the multiple images.

In more detail, multiple images are captured of the specimen container 102 at multiple different exposures (e.g., exposure times), and while illuminated at one or more different spectra having different nominal wavelengths. For example, each camera 440A, 440B, 440C may take about 4-8 or more images at different exposure times and at one or more spectra having different nominal wavelengths. Other numbers of multiple exposures may be taken.

The multiple spectral images may be accomplished by several different methods. In one embodiment, the multiple spectral images may be captured using different colored light sources 444A-444C. The light sources 444A-444C may backlight the specimen container 102 (as shown in FIGS. 4A-4B) and may be embodied as light panels, for example. Light sources 444A-444C may provide back lighting surrounding the imaging location 441. Light sources 444A-444C may be light panels. Light panels may include arrays of different colored lights therein or otherwise include means for pumping different colors of light therein. Light diffusers may be used in conjunction with the light sources 544A-544C in some embodiments. The panels may provide uniform lighting of a desired spectral color or wavelength range. In this embodiment, the cameras 440A-440C may be digital monochrome cameras. The light sources 444A-444C may capture images at various spectra that have relatively narrow bandwidth of about +/−35 nm. The light sources 444A-444C may have nominal emission peaks at approximately 634 nm (red), 537 nm (green), and 455 nm (blue), respectively, for example. However, other wavelength spectra may be used and more or less than three light sources may be used. Multi-spectral, multi-exposure images may then be captured by each of the cameras 440A-440C from the different viewpoints. Each of the color spectral images (represented by a nominal wavelength with some relatively narrow wavelength band) is captured, one after another, at various exposure times (e.g., 4-8 or more exposures). The spectral images may be taken in any order, such as red at multiple exposures, green at multiple exposures, and blue at multiple exposures. For the detection method, transmittance images may be computed, wherein each transmittance image (for each of R, G, B illumination) is computed from optimally-exposed images and reference images, as will be apparent from the following. The optimally-exposed images may be normalized by their respective per-pixel intensity.

Figure 4C:
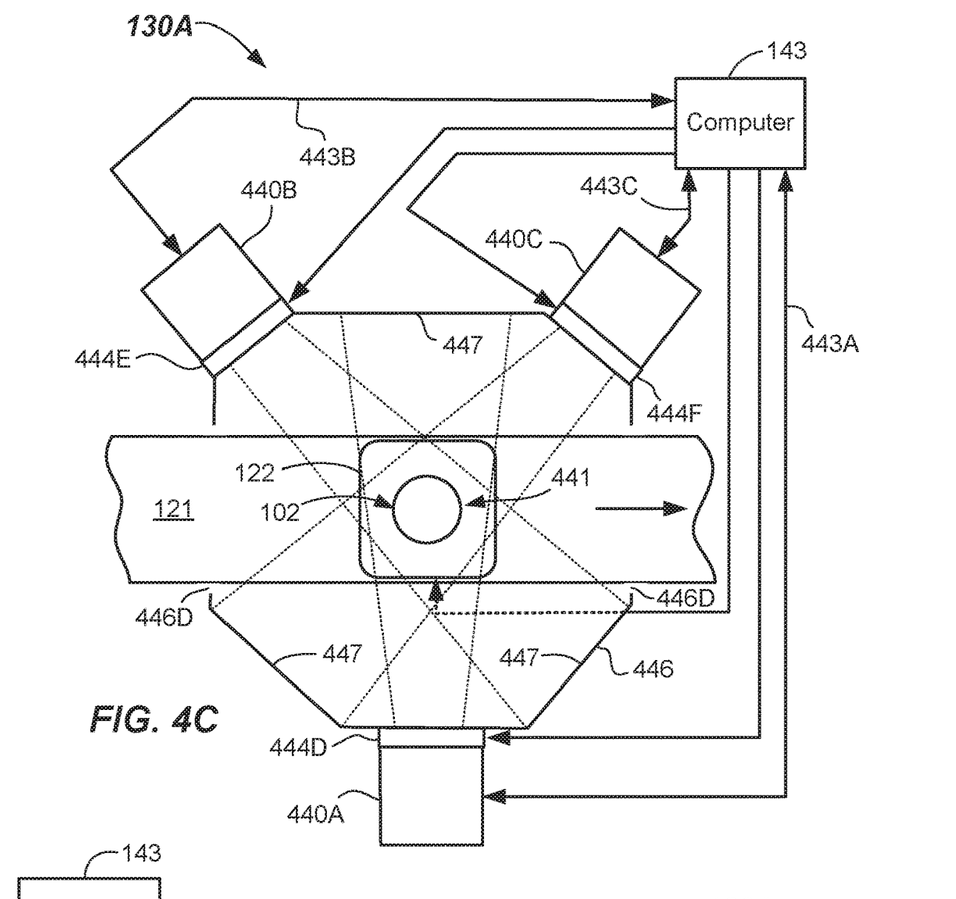
FIG. 4C illustrates a schematic top view of an alternate quality check module (with top housing portion removed to aid illustration) configured to capture and analyze multiple images according to one or more embodiments.
Figure 4D:
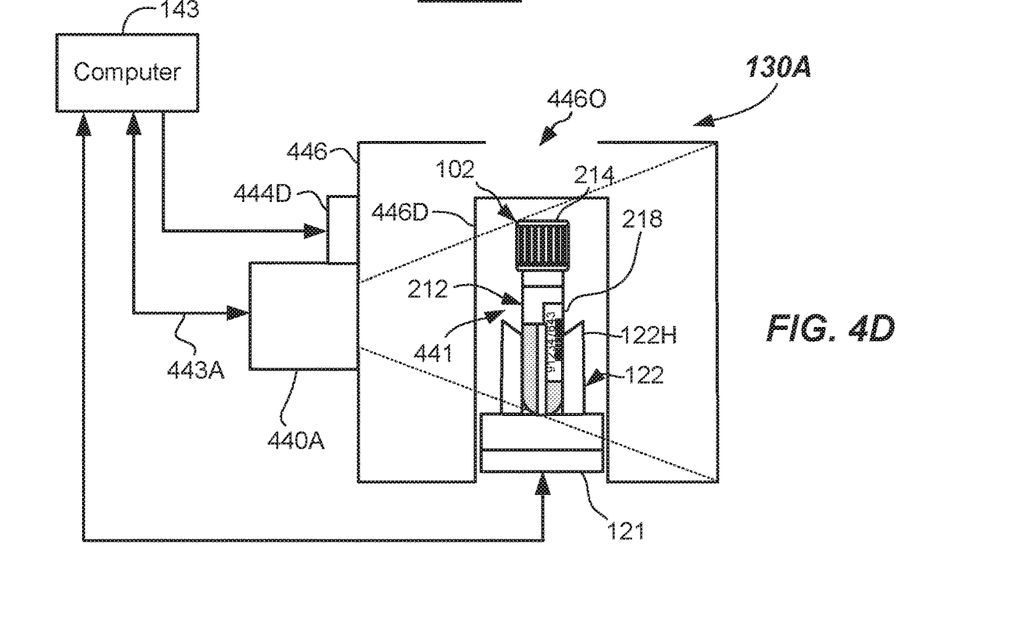
FIG. 4D illustrates a schematic side view (with side housing portion removed to aid illustration) of the quality check module of FIG. 4C according to one or more embodiments.

In optional embodiments, as best shown in FIGS. 4C and 4D, the specimen container 102 may be front lit in the quality check module 130A, such as by including light sources 444D, 444E, and 444F arranged adjacent to the cameras 440A, 440B, 440C, i.e., above, below, to the side, or combinations, but on the same side of the specimen container 102 as the respective cameras 440A-440C. In this embodiment, the cameras 440A-440C may be digital color cameras having RGB peaks of approximately 634 nm, 537 nm, and 455 nm, respectively, but wherein each of the RGB colors has a relatively wider wavelength range as compared to the discreet sources used in the above embodiment with the monochrome cameras. In this embodiment, the light sources 444D, 444E, and 444F may each be white light sources. For example, the light sources 444D-444F may emit a wavelength range of about 400 nm to about 700 nm and may be used to illuminate the specimen 212. Multiple images at different exposure times may be taken by each camera 440A-440C. Each white-light image captured may be separated into two or more color spectrum components at multiple n nominal wavelengths comprising at least two nominal wavelengths between about 400 nm and about 700 nm. For example, RGB spectral components may be separated out of the images by the computer 143 to generate the multi-spectral, multi-time exposure images. Images may be captured via signals from the computer 143 in lines 443A-443C.

To capture images at a first wavelength according to the first embodiment, three red light sources (nominal wavelength peak of about 634 nm with a spectral bandwidth of about +/−35 nm) may be used to simultaneously illuminate the specimen 212. The red illumination by the light sources 444A-444C may continue as multiple images (e.g., 4-8 or more images) at different exposure times are captured by each camera 440A-440C, such as in synchronism. In some embodiments, the exposure times may be between about 0.1 ms and 256 ms. Other exposure times may be used. For example, the exposure times may be at 8 ms, another at 32 ms, another at 64 ms, and another at 128 ms. Other numbers of exposures and time intervals may be used to capture multiple exposure time images. The red light sources 444A-444C may be turned on long enough to capture the multiple red backlit images and then may be turned off.

After capturing images using the red light sources 444A-444C, they may be turned off and another color spectra of light, for example, two or more green light sources 444A-444C may be turned on (nominal wavelength peak of about 537 nm with a spectral bandwidth of about +/−35 nm), and multiple images (e.g., 4-8 or more images) at different exposure times may be captured at that spectra by each camera 440A-440C arranged at the different viewpoints. This may be repeated with two or more blue light sources 444A-444C (nominal wavelength peak of about 455 nm with a spectral bandwidth of about +/−35 nm) for each camera 440A-440C. Thus, the result is a plurality of images captured at different exposure times, different spectra, and at different viewpoints. Other spectra, numbers of exposure times, or viewpoints may be optionally or additionally used. The different wavelength light sources 444A-444C may be accomplished via use of exchangeable color filters, for example, or banks of different narrow-band colored RGB light sources that can be selectively turned on and off, for example. Other means for effectively back lighting may be used. Likewise, other colors than RGB may be used.

To capture images according to the second embodiment, three white light sources 444D-444F may be used to simultaneously illuminate the specimen 212. As illuminated by the light sources 444D-444F, multiple images (e.g., 4-8 or more images) at different exposure times may be captured by each camera 440A-440C, such as in synchronism. In some embodiments, the exposure times may be between about 0.1 ms and 256 ms, for example. Other exposure times may be used. For example, one exposure may be at 8 ms, another at 32 ms, another at 64 ms, and another at 128 ms. Other numbers of exposures and time intervals may be used to capture multiple exposure time images. The multiple exposure images may be further processed by computer 143 to extract individual RGB images (obviously at lower pixel density) and at each of the exposure times and viewpoints. Thus, the result is a plurality of images per camera at different exposure times and illuminated with different spectra having different nominal wavelengths.

For each embodiment, all of these multi-spectrum images taken at multiple exposure times for each respective wavelength or wavelength range (e.g., white light) may be obtained in rapid succession, such that the entire collection of images for the specimen 212 from multiple viewpoints may be obtained in less than 2 s, for example.

To illustrate examples of the number of images captured for each specimen 212, the following examples are provided. According to the first embodiment, using RGB light sources and 4 different time exposure images for each wavelength and providing monochrome cameras at three viewpoints will result in 4 exposures×3 colors×3 viewpoints=36 images. According to the second embodiment, using white light sources and 4 different time exposure images and providing color cameras at three viewpoints will result in 4 exposures×3 viewpoints=12 images. However, these 12 images are then separated into RGB images by the computer 143, so that, in the end, 36 images are obtained, however the pixel density of these images is roughly ⅓ of the method of the first embodiment. In each case, the multi-exposure images may be stored in memory of the computer 143, and may be subsequently processed thereby.

In one or more embodiments, the quality check module 130 may include a housing 446 that may at least partially surround or cover the track 121 and provide a closed or semi-closed environment for image capture. The specimen container 102 may be located inside the housing 446 during each image capture. Housing 446 may include one or more doors 446D to allow the carrier 122 to enter and/or exit the housing 446. In some embodiments, the ceiling may include an opening 446O to allow a specimen container 102 to be loaded into a carrier 122 stationed inside the housing 446 by a robot (e.g., robot 124) including moveable robot fingers from above, such as when the quality check module 130 is located at the loading area 105. In cases where front lighting is used (FIGS. 4C-4D), the quality check module 130 may include may include backstop walls 447 to provide improved image contrast. Backstop walls 447 may be any suitable color, such as other than the expected range of color of the specimen 212. In some embodiments, a black colored material may be used.

In one aspect, processing of the data of the multi-spectral, multi-exposure time images may be directed at first determining a segmentation of the specimen 212 so that the tube 212T and cap 214 may be identified. Of course, the segmentation may also identify the liquid portion (e.g., the serum or plasma portion 212SP). The processing may involve, for example, selection of optimally-exposed pixels from each of the multiple captured images taken at the different exposure times and at each wavelength for each camera so as to generate optimally-exposed image data set for each wavelength for each camera 440A-440C. This is referred to as "image consolidation" herein. During image consolidation, for each spectral color, pixels in corresponding locations for each of the different exposure time images are compared, and only pixels exhibiting optimal image intensity may be selected from each of the different exposure time images. In one embodiment, optimal image intensity pixels may be pixels that fall within a predetermined range of intensity (e.g., between 180-254 on a scale of 0-255), for example. In another embodiment, optimal image intensity may be between 16-254 on a scale of 0-255, for example. Other non-optimal pixels are discarded as being under or over exposed. Other scales and optimal ranges may be used. If more than one pixel in the corresponding locations of two images is optimally exposed, then the higher intensity pixel of the two may be selected. Each of the optimally-exposed pixel intensities are then normalized per exposure time. The result is a plurality of normalized and consolidated spectral image data sets (e.g., red, green, blue) for each camera 440A-440C where all of the pixels are optimally exposed (e.g., one image data set per spectra (e.g., red, green, blue)).

As part of the calibration process of the quality check module 130, reference images without a specimen container 102 may be taken. The reference image(s) may be taken by each camera 440A-440C prior to the specimen container 102 and carrier 122 entering into the quality check module and at all the exposure times and lighting conditions that will be later used during image capture. In this way, computational burden of the computer 143 may be minimized by optionally subtracting background (i.e., the region outside of the specimen container 102) from each image data set just leaving the foreground image. This is referred to as "background removal" herein.

Figure 3:
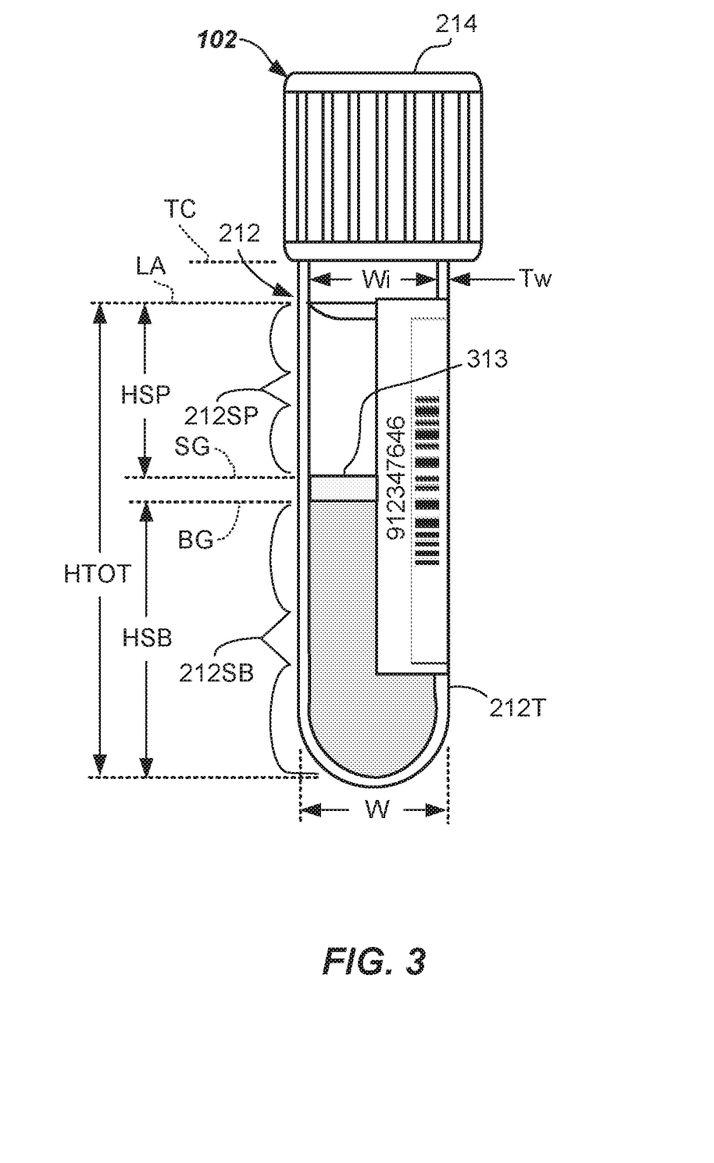
FIG. 3 illustrates a side view of a labeled specimen container including a separated specimen that may be quantified by a dimension quantification method according to one or more embodiments.
Figure 5:
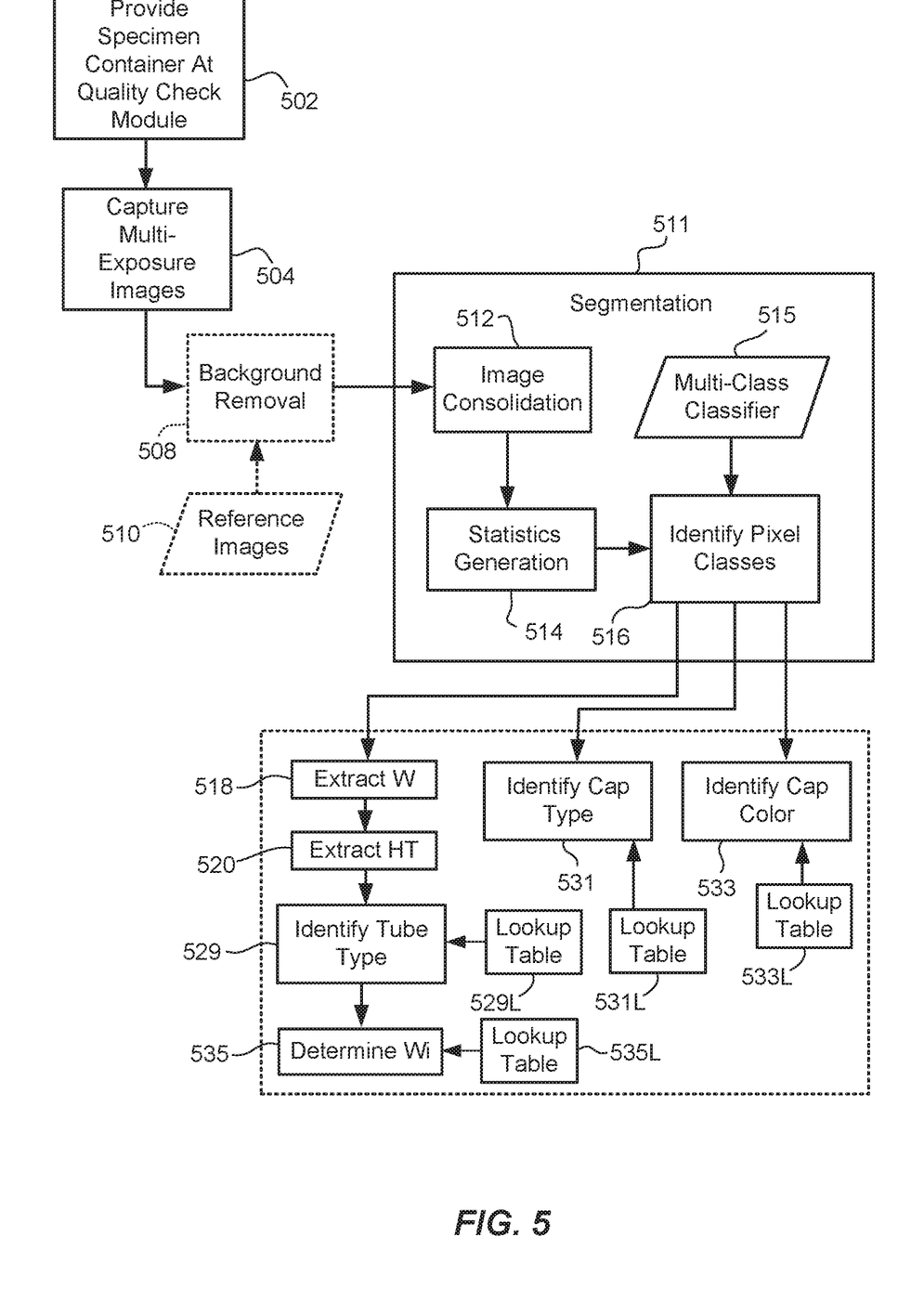
FIG. 5 illustrates a flowchart of functional components of a quality check module adapted to quantify a specimen container according to one or more embodiments.

For each spectral image data set including the normalized and optimally-exposed pixels, a segmentation process is undertaken to classify each of the pixels within the image data sets. The various segments of the specimen container 102 and specimen 212 may be characterized, i.e., each of the various classes and the boundaries thereof may be determined. This may be used to identify the tube 212T, i.e., transparent or translucent regions, and the cap 214. This may also be used to identify the liquid portion (e.g., the serum or plasma portion 212SP), gel separator 313 (if any), settled blood portion 212SB, and lines of demarcation between the components (e.g. LA, SB, SG, BG). Background and carrier 212 may also be segmented. The segmentation may be based on classifying the pixels in the optimally-exposed image data as belonging to a class based upon a classifier model (FIG. 5). The classifier model may be based upon a multi-class classifier 515 generated from multiple training sets. The multi-class classifier 515 may comprise a support vector machine (SVM) or a random decision tree, for example. Other types of multi-class classifiers may be used.

To carry out the classification, first statistical data may be computed for each of the optimally-exposed pixels at the different wavelengths (e.g., red, green, blue) and for each camera 440A-440C. The statistical data may include mean values and variances up to $2^{nd}$ order. Once generated, the statistical data is presented to and operated on by the multi-class classifier 515, which may classify the pixels in the images as belonging to one of a plurality of unique class labels, such as 1—serum or plasma portion, 2—settled blood portion, 3—cap, 4—label, 5—specimen container, 6—air, 7—gel separator (if used), 8—tube (e.g., the transparent region). Carrier 122 may also be classified. From this segmentation, the pixels making up the tube 212T and the cap 214 may be identified.

The results of the operation of the multi-class classifier 515 are to identify all pixels that are of the class 3—cap and class 8—tube. A simple flow chart of the specimen container characterization method is shown in FIG. 5. First the specimen container 102 including specimen 212 being carried by carrier 122 is provided at the quality check module 130 in 502. Multiple exposure images are captured at 504; the multiple exposure images being multi-spectral images taken at multiple different exposure times and at multiple different spectra (and/or wavelengths ranges) as described above. The multiple images may then be stored in memory of the computer 143. From these images, the background may optionally be subtracted in a background removal phase of 508 to lower computational burden. Background reduction is accomplished by subtracting reference images taken in 510, which may be taken as part of a calibration or as part of the method before carrier 122 and the specimen container 102 are provided at the imaging location 441.

After image capture, and possible background removal, the segmentation process may be accomplished on the multiple exposure, multiple wavelength data sets for each camera 440A-440C, as shown in 511. The segmentation process in 511 may include an image consolidation phase that may be undertaken in 512. During image consolidation in 512, the various images at each color spectra (e.g., nominal wavelength) are reviewed pixel by pixel to determine those pixels that are optimally exposed. For each corresponding pixel location, the best of any optimally-exposed pixel is selected and included in an optimally-exposed image data set. Each pixel intensity value is normalized by the exposure time. Thus, following image consolidation in 512, there is produced one normalized and optimally-exposed image data set for each wavelength spectra (e.g., color).

Following image consolidation in 512, or possibly concurrent therewith, a statistics generation process is undertaken in 514 where statistics are generated for each pixel, such as mean and/or covariance matrix. This statistical data and intensity information from the normalized and optimally-exposed data sets are then operated on by a multi-class classifier 515 to provide identification of pixel classes in 516 for all pixels in the image data sets. From this classification process of 516, each pixel in a consolidated image for each of the cameras 440A-440C is given a classification as being one of the plurality of class types, as listed above. During classification, the image is scanned and for each pixel location a class label is derived by using the multi-class classifier. In some embodiments, small super-pixel patches around the pixel location are used to make statistical description more robust with respect to the noise level of the cameras 440A-440C (e.g. 11×11 pixels).

From this, the pixels that are tube 212T and cap 214 are identified. All the pixels classified as cap 214 are collected together. From this, the shape of the cap 214 may be identified by blob or other suitable shape analysis technique in 531 by comparing the identified shape to a database of reference cap shapes stored in memory of the computer 143, such as in look-up tale 531L. Shape of the cap 214 identifies the cap type in 531. Shape of the cap 214 may indicate the type of material present in the specimen container, such as urine, sputum, feces and whether the container is under vacuum. Shape of the cap 214 may also indicate whether the specimen container has been evacuated.

The same collection of pixels that have been identified as cap 214 may be quantified for an average R, G, and B levels or a clustering approach in case of multi-colored caps, and from this RGB data the color of the cap 214 may be identified in 533 based upon a comparison of individual ranges of RGB values for known caps colors stored in a lookup table 533L. For an identified cap region the real color values may be extracted. Color calibration may occur at any desirable time prior to testing. Each real color value or multiple color values would be matched to database (e.g., a look-up table), where all tube colors are represented.

The tube 212T may be quantified by collecting together the various pixels identified in 516 as being of the class tube. The positions in pixel space between respective outermost lines of pixels of the tube 212T that are aligned substantially vertically are then subtracted to calculate and extract the width (W) in 518. The width (W) may be calculated as an average of the distances between the corresponding pixels at corresponding heights. The pixels measured in 518 may be those that are below the tube-cap interface TC, while ignoring pixels at the curved portion of the bottom of the specimen container 102.

The height (HT) is then extracted in 520. The height (HT) is measured between the bottom-most pixels classified as tube 212T and the tube-cap interface TC. This height (HT)

value may be taken, together with the width (W), to identify and characterize the size of the specimen container 102 from a list of possible sizes in 529 that may be stored in a look-up table 529L, for example (e.g., 10.25×47, 10.25×64, 10.25× 84, 13×75, 16×100, 13×100, all in mm×mm). Other standard sizes may be listed.

From these values, an estimated inner width (Wi) may be determined in 535. This inner width (Wi) may be used for calculations of volume of the serum or plasma portion 212SP and/or volume of the settled blood portion 212SB. The inner width (Wi) may be estimated based upon actual measured or estimated wall thickness (Tw) for each specimen container 102 of each size. These inner width (Wi) values may be stored on memory, such as in a look-up table 535L and useable for the volume measurements once the tube size is identified.

Figure 6:
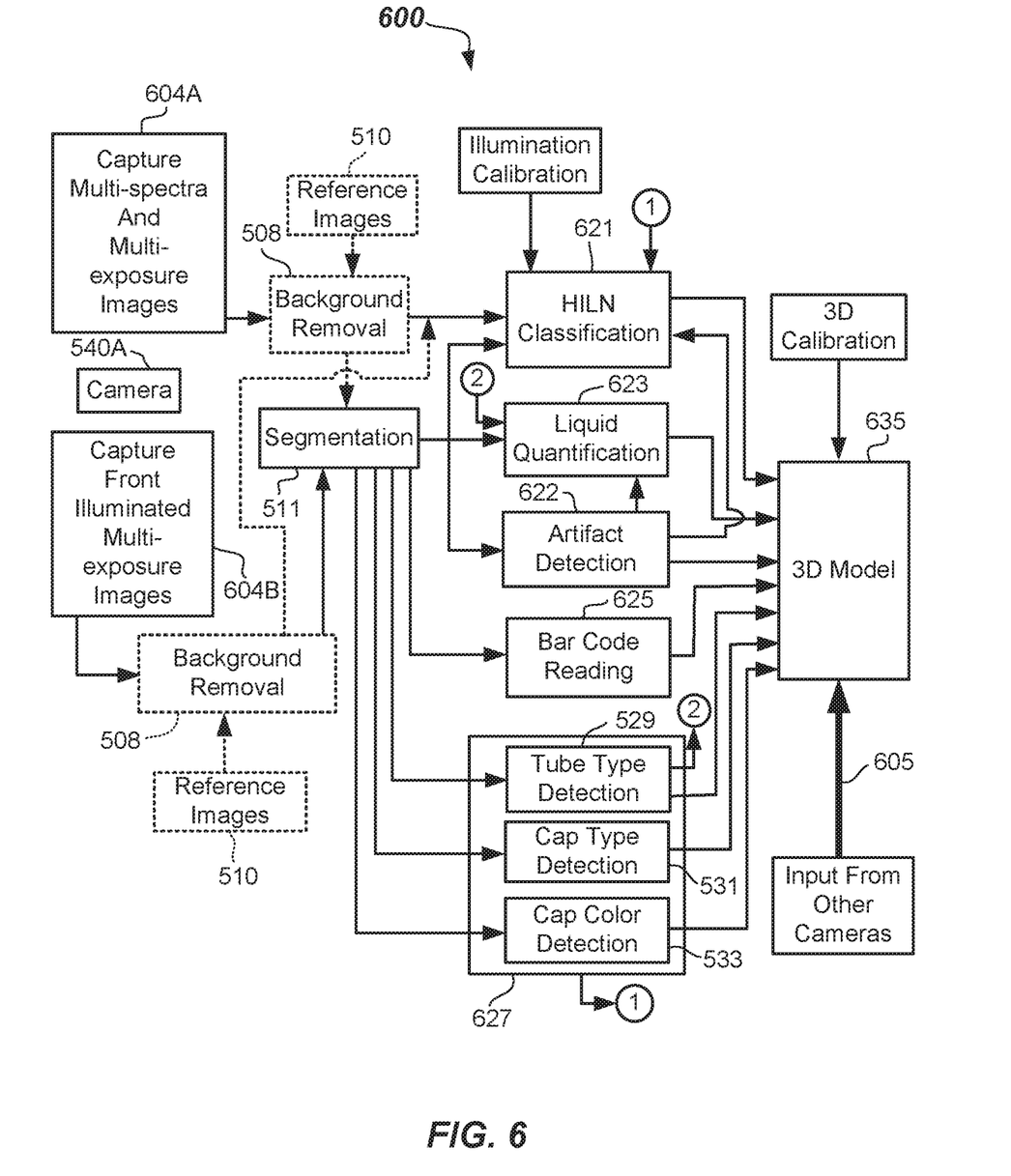
FIG. 6 illustrates flowchart of a broad imaging method adapted to quantify a specimen container according to one or more embodiments.

FIG. 6 illustrates a flowchart of a broader characterization method 600 wherein the characterization of the specimen container 102 containing the specimen 212 is just one of the many items that may be characterized or classified by the broader method 600 using the quality check module 130. According to one or more embodiments of the method 600, images are captured, such as by multiple cameras (camera 540A is shown). However, other cameras 540B, 540C may be used to capture images from other viewpoints. The processing that will be described for the images captured on camera 540A is identical for the other cameras 540B, 540C at the other viewpoints and their inputs in line 605 may be used to develop a 3D model of the specimen 212. The images captured by camera 540A and the other cameras 540B, 540C may be multi-spectral and multi-exposure images, as discussed above. In particular, multiple exposures (e.g., 4-8 or more exposures) may be taken for each wavelength of light used in 604A. The respective images at each exposure for each camera 540A-540O may be obtained simultaneously using monochrome cameras and backlight light sources 544A-544C as described in FIGS. 4A-4B. Optionally, front illuminated multi-exposure images using a white light sources 544D-544F may be obtained in 604B using a color camera.

The images may then be processed in 508 to remove background using reference images 510 as described above in optional background removal method. The images are then further processed to determine segmentation in 511 in the manner described above. In some embodiments, the images from front lit cameras 540A-540O (see FIGS. 4C-4D) from 604B may be best used for segmentation in 511. Likewise, the images captured in 604A may be best used for characterization of HILN in 621. However, clearly, images captured in 604B could be used for segmentation in 511.

Identifying and quantification of the liquid in 623 may also be carried out following segmentation in 511. Quantifying the liquid in 623 may involve the determination of certain physical dimensional characteristics of the specimen 212 such as a physical location of LA, SB, SG, and/or BG, and/or determination of HSP, HSB, and/or HTOT, and/or a volume of the serum or plasma portion (VSP) and/or a volume of the settled blood portion (VSB). The inner width (Wi) may be obtained from the specimen container characterization 627 as was described above. The identification may be accomplished by selecting the pixels at these demarcation areas and averaging their location values in pixel space to obtain a value for LA, SB or SPG. From this information, the volume of the serum or plasma portion 212SP may be determined. Correlation from pixel space to mechanical measurements may be accomplished by using any suitable calibration to calibrate pixel to mm.

To provide an even closer measurement of the actual volume of serum or plasma portion 212SP available, an artifact detection method may be employed in 622 to identify a presence of clot, bubbles, or foam. The respective estimated volume of the one or more artifacts present may be subtracted from the estimated volume of the serum or plasma portion 212SP determined above to obtain a better volume estimate. The images may then be processed to determine the presence of or absence of an artifact in the serum or plasma portion 212SP in 622 using an artifact classifiers. Those pixels including artifacts identified in artifact detection 622 may then be ignored be the HILN classification in 621. Detection of an artifact may also initiate a remediation in some embodiments.

The results of the segmentation in 511 can also be used to identify the label which may include the identifying information 215, such as a barcode. The barcode may be read in 625. Conventional barcode reading software may be used once the label 218 is identified by the segmentation in 511. If that image does not contain enough of the barcode to be read, the barcode can be read from the other images obtained from outer cameras.

Further characterization of the specimen container 102 may also be accomplished according to the broader method 600. The characterization of the tube type in 529, cap type in 531 and cap color in 533 may be fed to the 3D reasoning in 635 to verify that the same characterization was achieved based on processing the images from each camera. If slightly different values are obtained, then the values may be averaged. All of these outputs from the HILN Classification in 621, liquid quantification in 623, artifact detection in 622, and specimen container detection in 627 may be fed into the 3D reasoning in 735 and may be used to generate a 3D model.

Figure 7:
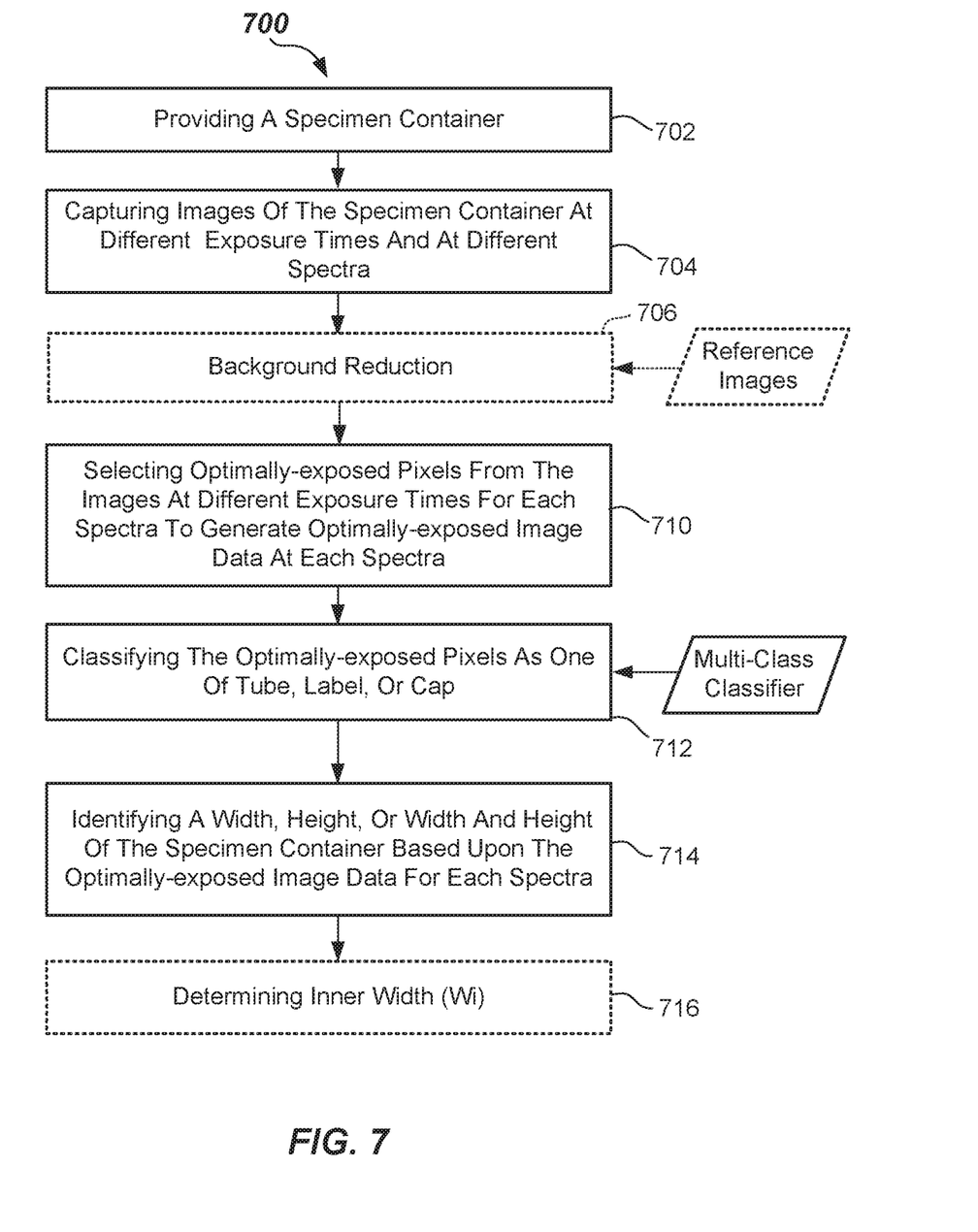
FIG. 7 illustrates flowchart of a method of quantifying a specimen container according to one or more embodiments.

FIG. 7 illustrates a flowchart of a method of determining characteristics of a specimen container 102 according to one or more embodiments. The method 700 includes providing a specimen container (e.g., specimen container 102, such as a capped, blood collection tube) in 702. Next, the method 700 includes capturing images of the specimen container at different exposures times and at different wavelengths in 704. For example, there may be 4-8 or more different exposures taken in some embodiments. Some images may be captured using white light for front lighting and some may be captured using a plurality of single-wavelength peak, narrow-band light sources, such as red, blue and green as backlit light sources 544A-544C. The white light images may be resolved into R, G, and B images as captured by the computer 143, as discussed above. In each instance, the images may be taken by multiple cameras 540A-540C from multiple viewpoints.

The method 700 may optionally include, as shown in 706, background reduction to subtract the background in order to lower computational burden. Background reduction may be accomplished by subtracting the reference images from the captured specimen images, which may be taken as part of a calibration process. Reference images may be taken at the same exposure times, spectrum, and lighting conditions as for the specimen images of the specimen container 102, but may be captured without a specimen container 102 or the carrier 122.

The method 700 includes, in 710, selecting optimally-exposed pixels from the images at different exposure times at each wavelength to generate optimally-exposed image data at each wavelength. For each corresponding pixel in each image at a particular spectra, the best exposed pixel (not under or over exposed) is selected. The optimal exposure range may be as discussed above. This selecting optimally-exposed pixels takes place in an image consolidation phase (e.g., image consolidation 512). Thus, for each of the RGB spectra, a data set of optimally-exposed pixels is generated.

Next, the method 700 includes classifying the optimally-exposed pixels as being tube 212T, label 218, or cap in 714. Classifying may be accomplished by computing statistical data of the optimally-exposed pixels at the different wavelengths to generate statistical data, and then operating on the statistical data of the optimally-exposed pixels to identify at least one of tube 212T, label 218, or cap 214. Other classes (e.g., serum or plasma portion 212SP, settled blood portion 212SB, gel separator 313, and/or air 212A) may also be identified by the segmentation.

In one or more embodiments, the multi-class classifier may be a support vector machine (SVM) that is either linear or kernel-based. Optionally, multi-class classifier may be a boosting classifier such as an adaptive boosting classifier (e.g., AdaBoost, LogitBoost, or the like), any artificial neural network, a tree-based classifier (e.g., decision tree, random decision forests), a logistic regression as a classifier, or the like. SVM may be particularly effective for classification between liquids (e.g., serum or plasma portion 212SP) and non-liquids such as cap, tube, or label. A SVM is a supervised learning model with associated learning algorithms that analyzes data and recognizes patterns. SVMs are used for classification and regression analysis.

Multiple sets of training examples are used to train the multi-class classifier, and then the pixels are operated on by the multi-class classifier and are marked as belonging to one of the multiple classes, as discussed above. A training algorithm builds the multi-class classifier and assigns any new examples into one of the classes. Thus, the multi-class classifier may be a non-probabilistic linear classifier in some embodiments. The SVM model represents examples as points in space that are mapped so that the examples of the separate classes are divided by a clear gap that is as wide as possible. Pixels from the optimally-exposed image data set may be mapped into that same feature space and predicted to belong to a particular class based on where they fall. In some embodiments, SVMs can efficiently perform a non-linear classification using what is called a kernel trick (e.g., kernel-based SVM classifier), implicitly mapping their inputs into high-dimensional feature spaces. SVM and boosting may also be used. Other types of multi-class classifiers may be used.

The multi-class classifier may be trained by graphically outlining various regions (e.g., tube 212T, cap 214, air 212A, and label 218) in a multitude of examples of specimen containers 102 having various tube sizes, and/or cap types and colors, and labels 218. As many as 500 or more images may be used for training the multi-class classifier. Each training image may be outlined manually to identify and teach the multi-class classifier which areas belong to each class. Other training methods may be used.

Finally, the method 700 includes identifying a width, height, or width and height of the specimen container based upon the optimally-exposed image data for each wavelength in 714.

In some embodiment, once the specimen container 102 has been given a characterization of size, such as from height and width, volume of the specimen 212, the inside width (Wi) of the specimen container 102 may be obtained. The inner width (Wi) may be determined in 716, such as by using a lookup table based upon the size of the specimen container 102. The inner width (Wi) may be used to accurately calculate volume of the serum or plasma portion 212SP and/or the volume of the settled blood portion 212SB.

Accordingly, based on the foregoing it should be apparent that the model-based specimen container characterization method 700 carried out by the quality check module 130 may result in a rapid characterization of the physical attributes of the specimen container 102 such as tube size, cap type, and cap color. Based upon this information, accurate volumes may be determined, cross checks between the ordered tests and specimen container used, and verification that the additives present are compatible with the test ordered.

While the quality check module 130 has been shown in FIG. 1 as being located such that the pre-screening is performed immediately after centrifugation on the centrifuge 125, it may be advantageous to include the quality check module 130 directly on an analyzer (e.g., analyzer 106, 108, and/or 110) in some embodiments, or elsewhere. For example, stand-alone analyzers that are not connected to an automated specimen container handling system could use the quality check module 130 to validate specimens 212 prior to analysis. Furthermore, in some embodiments, the centrifugation may be performed prior to loading the racks 104 into the loading area 105, so that in some embodiments, the quality check module 130 may be located at the loading area 105 and the quality check can be carried out as soon as the robot 124 loads a specimen container 102 into a carrier 122. Other locations for the quality check module 130 are possible.

While the invention is susceptible to various modifications and alternative forms, specific apparatus embodiments and methods thereof have been shown by way of example in the drawings and are described in detail herein. It should be understood, however, that it is not intended to limit the invention to the particular apparatus or methods disclosed but, to the contrary, the intention is to cover all modifications, equivalents, and alternatives falling within the scope of the invention.

What is claimed is:

1. A method of determining characteristics of a specimen container, comprising:
   providing a specimen container;
   capturing images of the specimen container at different exposures times and at different spectra having different nominal wavelengths;
   selecting optimally-exposed pixels from the images at different exposure times at each spectra to generate optimally-exposed image data for each spectra;
   classifying the optimally-exposed pixels as at least being one of tube, label or cap; and
   identifying a width, height, or width and height of the specimen container based upon the optimally-exposed image data for each spectra.

2. The method of claim 1, comprising identifying a cap type of the specimen container.

3. The method of claim 1, comprising identifying a label of the specimen container.

4. The method of claim 1, comprising identifying any region which is a holder.

5. The method of claim 1, wherein the capturing images of the specimen container comprises capturing multiple images from a number of different viewpoints.

6. The method of claim 5, wherein the number of different viewpoints comprises 3 or more.

7. The method of claim 1, wherein the classifying the optimally-exposed pixels is based upon a multi-class classifier generated from multiple training sets.

8. The method of claim 7, wherein the multi-class classifier comprises a support vector machine.

9. The method of claim 1, comprising determining an inner width of the specimen container based upon the width and height of the specimen container.

10. A quality check module configured to determine characteristics of a specimen container, comprising:
- a plurality of cameras arranged at multiple viewpoints around an imaging location configured to receive the specimen container, each of the plurality of cameras configured to capture multiple images of at least a portion of the specimen container at different exposures times and at different spectra having different nominal wavelengths from the multiple viewpoints; and
- a computer coupled to the plurality of cameras, the computer configured to:
  - select optimally-exposed pixels from the images at the different exposure times at each of the different spectra to generate optimally-exposed image data for each spectra and viewpoint,
  - classify the optimally-exposed image data as at least being one of tube, cap, or label, and
  - identify a width, height, or width and height of the specimen container based upon the optimally-exposed image data for each spectra.

11. The quality check module of claim 10, comprising a housing surrounding the imaging location.

12. The quality check module of claim 10, comprising a back lighting surrounding the imaging location.

13. The quality check module of claim 10, comprising front lighting surrounding the imaging location.

14. The quality check module of claim 10, wherein the imaging location is on a track, the specimen container configured to be received in a receptacle of a carrier moveable on the track.

15. The quality check module of claim 10, configured to identify a cap type of the specimen container.

16. The quality check module of claim 10, configured to identify a label of the specimen container.

17. The quality check module of claim 10, wherein the classifying the optimally-exposed image data is based upon a multi-class classifier generated from multiple training sets.

18. The quality check module of claim 17, wherein the multi-class classifier comprises a support vector machine.

19. The quality check module of claim 10, configured to determine an inner width of the specimen container based upon the width and height of the specimen container.

20. A specimen testing apparatus, comprising:
- a track;
- specimen carriers moveable on the track, the specimen carriers configured to carry specimen containers; and
- a quality check module arranged on the track and configured to determine characteristics of a specimen container, the quality check module comprising:
  - a plurality of cameras arranged at multiple viewpoints around an imaging location configured to receive the specimen container, each of the plurality of cameras configured to capture multiple images of at least a portion of the specimen container at different exposures times and at different spectra having different nominal wavelengths from the multiple viewpoints; and
  - a computer coupled to the plurality of cameras, the computer configured to:
    - select optimally-exposed pixels from the images at the different exposure times at each of the spectra to generate optimally-exposed image data for each spectra and viewpoint,
    - classify the optimally-exposed image data as at least being one of tube, cap, or label, and
    - identify a width, height, or width and height of the specimen container based upon the optimally-exposed image data for each spectra.

\* \* \* \* \*